(12) United States Patent
Deforge et al.

(10) Patent No.: US 11,654,486 B2
(45) Date of Patent: May 23, 2023

(54) GEAR SHAFT AND METHOD OF MANUFACTURING

(71) Applicant: Hamilton Sundstrand Corporation, Charlotte, NC (US)

(72) Inventors: Jasen Deforge, South Windsor, CT (US); Andy Mugrage, Byron, IL (US)

(73) Assignee: Hamilton Sundstrand Corporation, Charlotte, NC (US)

( * ) Notice: Subject to any disclaimer, the term of this patent is extended or adjusted under 35 U.S.C. 154(b) by 0 days.

(21) Appl. No.: 17/545,879

(22) Filed: Dec. 8, 2021

(65) Prior Publication Data

US 2022/0136112 A1 May 5, 2022

Related U.S. Application Data

(62) Division of application No. 16/450,664, filed on Jun. 24, 2019, now Pat. No. 11,220,751.

(51) Int. Cl.
| | |
|---|---|
| *B33Y 80/00* | (2015.01) |
| *B22F 10/20* | (2021.01) |
| *B22F 10/25* | (2021.01) |
| *F16C 3/02* | (2006.01) |
| *F16H 55/17* | (2006.01) |
| *F16H 57/00* | (2012.01) |

(Continued)

(52) U.S. Cl.
CPC ............. *C23C 26/00* (2013.01); *B22F 10/20* (2021.01); *B22F 10/25* (2021.01); *B33Y 10/00* (2014.12); *B33Y 80/00* (2014.12); *C23C 24/00* (2013.01); *F16C 3/02* (2013.01); *F16C 3/023* (2013.01); *F16H 55/17* (2013.01); *F16H 57/0025* (2013.01)

(58) Field of Classification Search
CPC .......... B22F 10/20; B22F 10/25; B22F 10/66; B22F 2207/01; B22F 2999/00; B22F 5/08; C23C 24/00; C23C 26/00; F16H 55/17; F16H 57/0025; B33Y 10/00; B33Y 80/00; Y02P 10/25; F16C 2204/60; F16C 2220/00; F16C 2361/61; F16C 3/02; F16C 3/023
See application file for complete search history.

(56) References Cited

U.S. PATENT DOCUMENTS 9,700,957 B1 * 7/2017 Burgess ................ B23K 20/16
2015/0323053 A1 11/2015 El-Wardany et al.
(Continued)

OTHER PUBLICATIONS

Choi, S. H., et al., "A Topological Hierarchy-based Approach to Layered Manufacturing of Functionally Graded Multi-material Objects", Computers in Industry, Elsevier, Amsterdam, NL, , vol. 60, No. 5, Jun. 1, 2009, pp. 349-363.
(Continued)

*Primary Examiner* — Alexander M Weddle
(74) *Attorney, Agent, or Firm* — Locke Lord LLP; Joshua L. Jones; Scott D. Wofsy

(57) ABSTRACT

A method of manufacturing a gear shaft including depositing only a first material via directed energy deposition (DED), forming a first portion of the gear shaft via the depositing only the first material via directed energy deposition (DED), forming a transitioning portion of the gear shaft via depositing of a varying ratio of the first material with a second material via DED, and forming a second portion of the gear shaft via the depositing via DED of only the second material.

9 Claims, 1 Drawing Sheet

(51) Int. Cl.
  *C23C 26/00*   (2006.01)
  *C23C 24/00*   (2006.01)
  *B33Y 10/00*   (2015.01)

(56) References Cited

U.S. PATENT DOCUMENTS

2017/0261087 A1    9/2017   White et al.
2018/0080503 A1    3/2018   Iyer
2018/0298954 A1*  10/2018   Campbell ............... F16C 3/023

OTHER PUBLICATIONS

Extended European Search Report dated May 8, 2020, issued during the prosecution of European Patent Application No. EP 19212730.6.

* cited by examiner

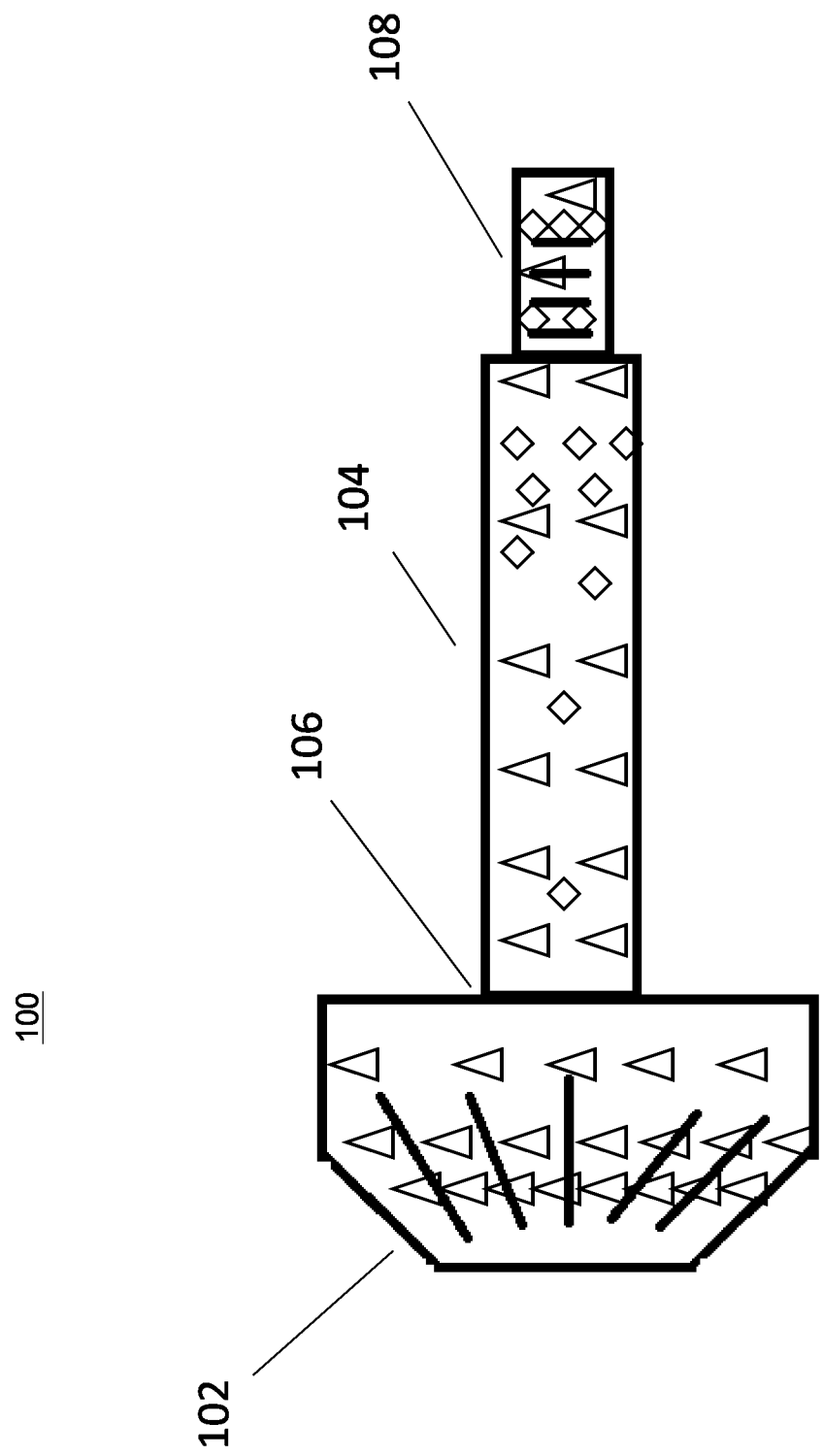

GEAR SHAFT AND METHOD OF MANUFACTURING

CROSS-REFERENCE TO RELATED APPLICATION

This application is a divisional application of U.S. patent application Ser. No. 16/450,664 filed on Jun. 24, 2019, which is incorporated herein by reference in its entirety.

BACKGROUND

Technological Field

The present disclosure relates to gear shaft manufacturing, and more particularly to gear manufacturing using directed energy deposition.

Description of Related Art

Traditionally gear shafts are manufactured using welding to complete an assembled product. Gears of various materials are required to operate in certain environmental conditions. Welding operation is complex and costly.

Thus, there is a need in the art to eliminate the need for welding of gear shafts in order to reduce cost and lead time for manufacture of gear assemblies while providing increase performance, life, and reliability of gear components. The present disclosure may provide a solution for at least one of these challenges.

SUMMARY OF THE INVENTION

A method of manufacturing a gear shaft includes depositing only a first material via directed energy deposition (DED), forming a first portion of the gear shaft via the depositing only the first material via directed energy deposition (DED), forming a transitioning portion of the gear shaft via depositing of a varying ratio of the first material with a second material via DED, and forming a second portion of the gear shaft via the depositing via DED of only the second material. The shaft can be manufactured by a continuous process and be machined a final dimension of the first portion, the second portion, or the transitioning portion.

Forming the transitioning portion can include a single build direction from the first portion to the second portion. Forming the first portion can include depositing the first material in powder or wire form.

A gear shaft includes a first portion including only a first material, a second portion including only a second material, a transitioning portion, attached to both the first portion and the second portion, including a varying ratio of the first material to the second material along a length of the transitioning portion.

The transitioning portion can include a lengthwise majority of the shaft. The transitioning portion can include a gradient of the first material and a gradient of the second material there through. The gradient can be constant, stepped, or exponential.

The first material can include a higher magnetic property than the second material. The first material can also include a higher coefficient of thermal expansion than the second material. The second material can include a second melting point and/or softening temperature and/or a second shear strength that is less than a first melting point and/or softening temperature and/or a first shear strength of the first material. The materials include titanium, aluminum, nickel or steel.

The amount of the first material can change at approximately 5% per millimeter over the length of the shaft portion and the amount of second material also changes at a rate of approximately 5% per millimeter over the length of the shaft. The first amount of the first material is different from the first amount of the second material.

These and other features of the systems and methods of the subject disclosure will become more readily apparent to those skilled in the art from the following detailed description of the preferred embodiments taken in conjunction with the drawings.

BRIEF DESCRIPTION OF THE DRAWINGS

So that those skilled in the art to which the subject disclosure appertains will readily understand how to make and use the devices and methods of the subject disclosure without undue experimentation, preferred embodiments thereof will be described in detail herein below with reference to certain figures, wherein:

FIG. 1 is a side view of a gear shaft showing an increasing amount of a first material in a first along a length thereof and decreasing amount of a second material along the length thereof.

DETAILED DESCRIPTION

Reference will now be made to the drawings wherein like reference numerals identify similar structural features or aspects of the subject disclosure. For purposes of explanation and illustration, and not limitation, a partial view of an exemplary embodiment of a gear shaft in accordance with the disclosure is shown in FIG. 1 and is designated generally by reference character 100. The methods and systems of the disclosure can be used to simplify production of gear shafts, while providing safer manufacturing techniques and requiring less energy, and enabling gear assemblies that contain materials with mechanical properties very specific and tailored to the application.

FIG. 1, shows a gear shaft 100 produced by directed energy deposition, the additive process in which metal wire or powder is deposited in a layer by layer manner to produce a near net shape final component. A first portion 102 of the gear shaft is formed by depositing on a baseplate a first amount of a first material by directed energy deposition (DED) using a powder or wire as a source of the material wherein the first portion includes only the first material, forming a transitioning portion 104, attached to the first portion 102, by depositing a varying amount of the first material by DED and a varying amount of a second material by DED on an end 106 of the first portion 102 wherein the transition portion 104 includes a mixtures of the first and second materials and forming a second portion of the gear shaft, attached to the transitioning portion, by DED, wherein the second portion 108 includes a second amount of the second material wherein the second portion 108 includes only the second material. The shaft 100 is manufactured by a continuous process and the outer surface can later be machined to a final dimension. Forming the transitioning portion 104 includes a single build direction from the first portion 102 to the second portion 108.

Referring again to FIG. 1, the gear shaft 100 includes a bevel gear 102 configured to be used in a harsh operating environment, including a first amount of a first material, the transition portion 104, attached to the bevel gear 102, includes a decreasing amount of the first material along a length of the gear shaft and a second material wherein the amount of the second material increases along the length of the gear shaft, and a second end, the second end 108 being a output gear shaft section attached to the transitioning portion 104, wherein the second portion includes a second amount of the second material. A gradient provides properties for optimal performance in distinct system environments, while entirely reducing the need for a complex joining operation.

As show in in FIG. 1, the transitioning portion 104 includes a lengthwise majority of the shaft 104. The transitioning portion 104 includes a gradient of the first material and a gradient of the second material therethrough. The gradient can be constant, be stepped, or be exponential, depending on application requirements. The first material includes a different magnetic property than the second material and a different coefficient of thermal expansion than the second material. The second material includes a second melting point and/or softening temperature and/or a second shear strength that is different than a first melting point and/or softening temperature and/or a first shear strength of the first material. The materials include titanium, aluminum, nickel or steel. The amount of the first material can change at approximately 5% per millimeter over the length of the shaft 100 and the amount of second material also changes at a rate of approximately 5% per millimeter over the length of the shaft 100 as well. This transition rate ensures this shaft will be able to withstand both structural and thermal loads.

Traditional methods have produced gear shafts including a definitive border between a first material and the second material, which result in a shorter time between failures and increased risk of defects related to joining methods.

The methods and systems of the present disclosure, as described above and shown in the drawings, provide for gear shaft with superior properties including increased reliability and stability, and/cost. While the apparatus and methods of the subject disclosure have been shown and described with reference to embodiments, those skilled in the art will readily appreciate that changes and/or modifications may be made thereto without departing from the spirit and score of the subject disclosure.

What is claimed is:

1. A gear shaft comprising:
    a first portion including only a first material;
    a second portion including only a second material; and
    a transitioning portion, attached to both the first portion and the second portion, including a varying ratio of the first material to the second material along a length of the transitioning portion, wherein the transitioning portion includes a lengthwise majority of the shaft.

2. The shaft of claim 1, wherein the transitioning portion includes a gradient of the first material and a gradient of the second material there through.

3. The shaft of claim 2, wherein the gradient of the first material is 5% per millimeter.

4. The shaft of claim 2, wherein the gradient of the second material is 5% per millimeter.

5. The shaft of claim 2, wherein the gradient is constant, stepped, or exponential.

6. The shaft of claim 1, wherein the first material includes a higher magnetic property than the second material in a given magnetic field.

7. The shaft of claim 1, wherein the first material includes a higher coefficient of thermal expansion than the second material at a given temperature.

8. The shaft of claim 1, wherein the second material includes a second melting point and/or softening temperature and/or a second shear strength that is less than a first melting point and/or softening temperature and/or a first shear strength of the first material.

9. The shaft of claim 1, wherein the materials include titanium, aluminum, nickel or steel.

\* \* \* \* \*